(12) United States Patent
Schiller et al.

(10) Patent No.: US 8,636,031 B2
(45) Date of Patent: *Jan. 28, 2014

(54) TWO EDUCTOR / FOUR-WAY SELECTOR VALVE ASSEMBLY

(75) Inventors: Steven E. Schiller, Kenosha, WI (US); James H. Lohr, Union Grove, WI (US); Paul J. Larson, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,062

(22) Filed: May 29, 2012

(65) Prior Publication Data

US 2012/0247593 A1 Oct. 4, 2012

Related U.S. Application Data

(63) Continuation of application No. 12/063,333, filed as application No. PCT/US2006/030399 on Aug. 3, 2006, now Pat. No. 8,186,383.

(60) Provisional application No. 60/707,399, filed on Aug. 11, 2005.

(51) Int. Cl.
*F16K 11/085* (2006.01)

(52) U.S. Cl.
USPC ..................... 137/625.47; 137/597

(58) Field of Classification Search
USPC .......... 137/597, 625.41, 625.46, 625.47, 883
See application file for complete search history.

(56) References Cited

FOREIGN PATENT DOCUMENTS

JP 2002-332670 11/2002
JP 2004-509020 3/2004

*Primary Examiner* — John Fox
(74) *Attorney, Agent, or Firm* — Michael Best & Friedrich LLP

(57) ABSTRACT

A selector valve assembly controlling the flow of different flow paths of fluid. The assembly includes a body member having a compartment with an end wall, an outlet passage in the end wall, two ports connected to the body member and communicating with the outlet passage in the end wall, and two passages communicating with the compartment. A rotatable member is sealable positioned in the compartment and has a side wall and an end wall. A first passageway extends a distance into the rotatable member from the end wall thereof and a second passageway extends through the side wall thereof and communicates with the first passageway. Rotation of the rotatable member selectively orients the second passageway with each of the two passages to cause liquid in the two passages to pass to the first and second passageways and subsequently to the outlet passage and at least one of the ports.

15 Claims, 5 Drawing Sheets

TWO EDUCTOR / FOUR-WAY SELECTOR VALVE ASSEMBLY

CROSS-REFERENCES TO RELATED APPLICATIONS, IF ANY

This application is a continuation of U.S. patent application Ser. No. 12/063,333, filed Oct. 15, 2008, which is a U.S. national phase application filing of International Patent Application No. PCT/US2006/030399, filed Aug. 3, 2006, which claims the benefit of and priority to U.S. Provisional Patent Application No. 60/707,399, filed Aug. 11, 2005, the entire contents of each of which are incorporated herein by reference.

STATEMENT REGARDING FEDERALLY SPONSORED RESEARCH OR DEVELOPMENT

None.

BACKGROUND OF THE INVENTION

1. Technical Field

This invention relates to a selector valve assembly. More particularly, it relates to a selector valve assembly which can regulate the flow of at least four different fluid materials in conjunction with a dispensing eductor.

2. Background Art

The use of selector valves in conjunction with eductors for mixing chemical concentrates into a stream of liquid to provide a diluted solution is well-known. For example, see U.S. Pat. Nos. 5,377,718 and 5,653,261.

While these selector valves can control and select four different chemical concentrates to be introduced into an eductor, there is a problem with residual carry-over when selecting from one chemical concentrate for another. This is caused by the use of the channeled disks 11 in the '718 and '261 patents.

All current selector valve systems which utilize two separate eductors to provide a high and low flow rate use two separate selector valves for each eductor. Not only does this add cost and complexity to the system, it makes the system easier for the end user to mishandle. They can have the selector valve pointed to one product of one eductor and accidentally fill a different product from the second eductor. These types of systems also require labeling of the dispenser for product identification which can also cause misuse.

There is a need for a selector valve which can be used in conjunction with an eductor mixing system which can reduce the incidence of product carry-over when a selector valve is moved from one position to another. There is also a need for a selector valve which can reduce costs and mishandling.

The objects of the invention therefore are:

a.) Providing an improved selector valve.

b.) Providing an improved selector valve for use with a liquid mixing and dispensing apparatus.

c.) Providing a selector valve of the foregoing type for use with an eductor.

d.) Providing a single selector valve of the foregoing type which can accommodate two different eductors.

e.) Providing a selector valve of the foregoing type which reduces the incidence of product carry-over.

f.) Providing a selector valve of the foregoing type which employs a minimum number of parts and reduces incidence of improper dispensing.

g.) Providing a combined selector valve and eductor assembly.

These and still other objects and advantages of the invention will be apparent from the description which follows. In the detailed description below, a preferred embodiment of the invention will be described in reference to the full scope of the invention. Rather, the invention may be employed in other embodiments.

SUMMARY OF THE INVENTION

The foregoing objects are accomplished and the shortcomings of the prior art are accomplished by the selector valve assembly of this invention which can control the flow of at least two flow paths of fluid. The selector valve assembly has a body member having a compartment with an end wall. There is an outlet passage in the end wall of the compartment and at least two passages communicate with the compartment. A rotatable member is sealably positioned in the compartment, the rotatable member having a side wall and an end wall. A first passageway extends a distance into the rotatable member from the end wall thereof. A second passageway extends through the side wall thereof and communicates with the first passageway. Rotation of the rotatable member will selectively orientate the second passageway with each of the at least two passages so as to cause liquid in the at least two passages to pass to the first and second passageways and subsequently to the outlet passage.

In a preferred embodiment, the selector valve assembly includes four passage ports connected to the body member and communicating with the second passageway in the rotatable member.

In one aspect, the selector valve assembly includes swivel ports connected to the body member and communicating with the four passages in the body member.

In another preferred embodiment, an indexing member is connected to the rotatable member.

In another aspect, the selector valve assembly includes a spring member in biasing contact with the indexing member and a spring retaining member connected to the body member and the spring member.

In yet another aspect, the selector valve assembly includes color indicator means operatively associated with each of the swivel port members.

In yet another preferred embodiment, there are two eductors connected to the outlet passage of the body member.

In still another preferred embodiment, two eductors are connected to the outlet passage of the body member by check valves.

In another aspect, a selector valve assembly, which can control the flow of at least four flow paths of fluid, includes a body member having a compartment with an end wall, an outlet passage in the end wall of the compartment, two ports connected to the body member and communicating with the outlet passage in the end wall of the compartment, and at least two passages communicating with the compartment. A rotatable member is sealably positioned in the compartment and has a side wall and an end wall. A first passageway extends a distance into the rotatable member from the end wall thereof and a second passageway extends through the side wall thereof and communicates with the first passageway. Rotation of the rotatable member will selectively orientate the second passageway with each of the at least two passages so as to cause liquid in the four passages to pass to the first and second passageways and subsequently to the outlet passage.

DESCRIPTION OF THE PREFERRED EMBODIMENTS

Figure 1:
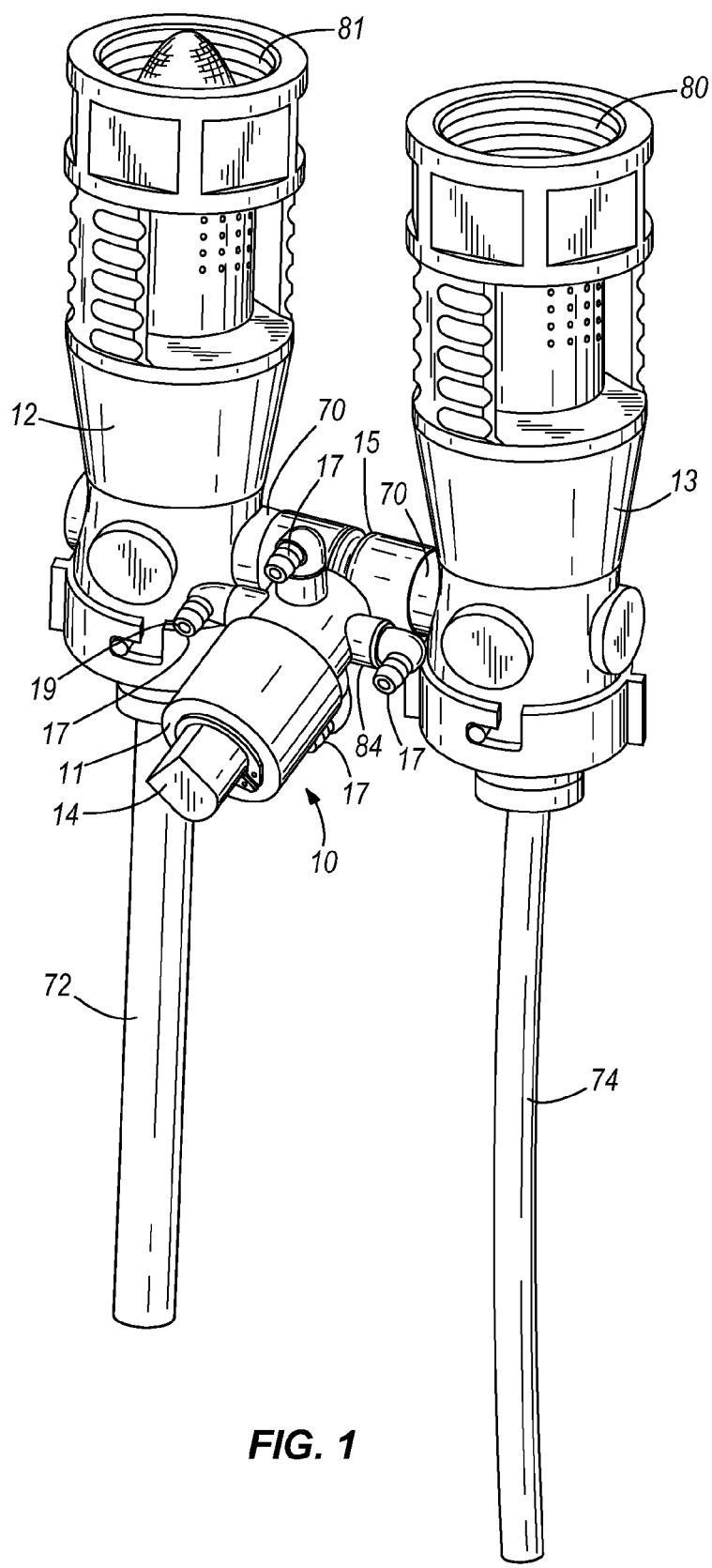
FIG. 1 is a perspective view showing the selector valve assembly connected to two eductors.

Referring to FIG. 1, the selector valve assembly generally 10 is shown in conjunction with two eductors 12 and 13. The preferred eductors are described in commonly owned patent application Ser. No. 11/195,052 filed Aug. 2, 2005 which teachings are incorporated herein. The selector valve assembly 10 includes a valve member 11 with a valve stem 14 housed in a tubular body member 15 to which is connected in a fluid tight manner four fluid intake ports 17, each having nipples 19.

Figure 2:
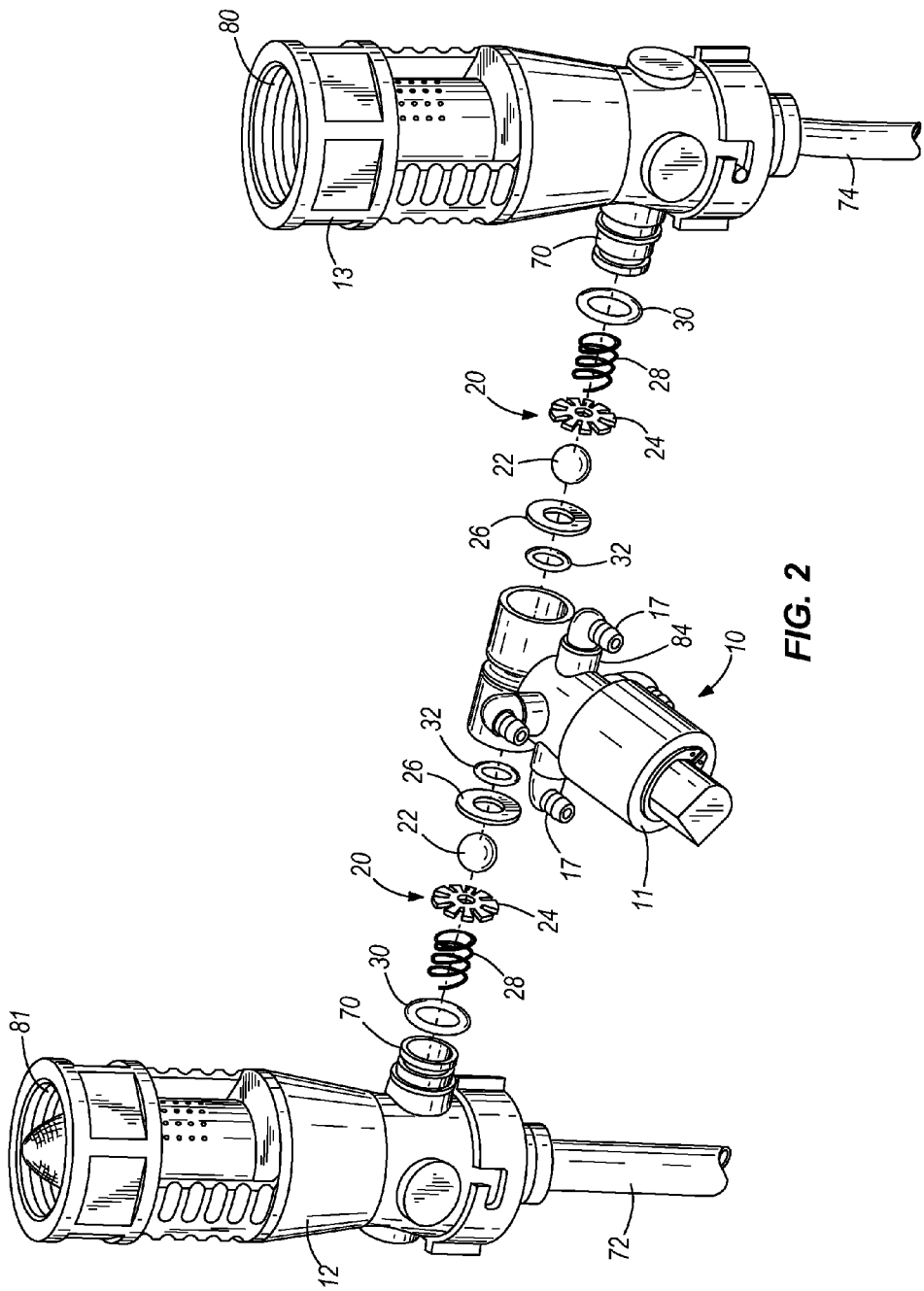
FIG. 2 is an exploded view showing the component parts of the valve for interconnection to the eductors.

As seen in FIG. 2, the selector valve assembly 10 includes two check valve mechanisms generally 20 disposed between the valve member 11 and the eductors 12 and 13. The check valves 20 include check balls 22 and 23. A ball seating washer 26 and check ball guide 24 are also provided as well as a spring 28. Sealing rings are also shown at 30 and 32.

Figure 3:
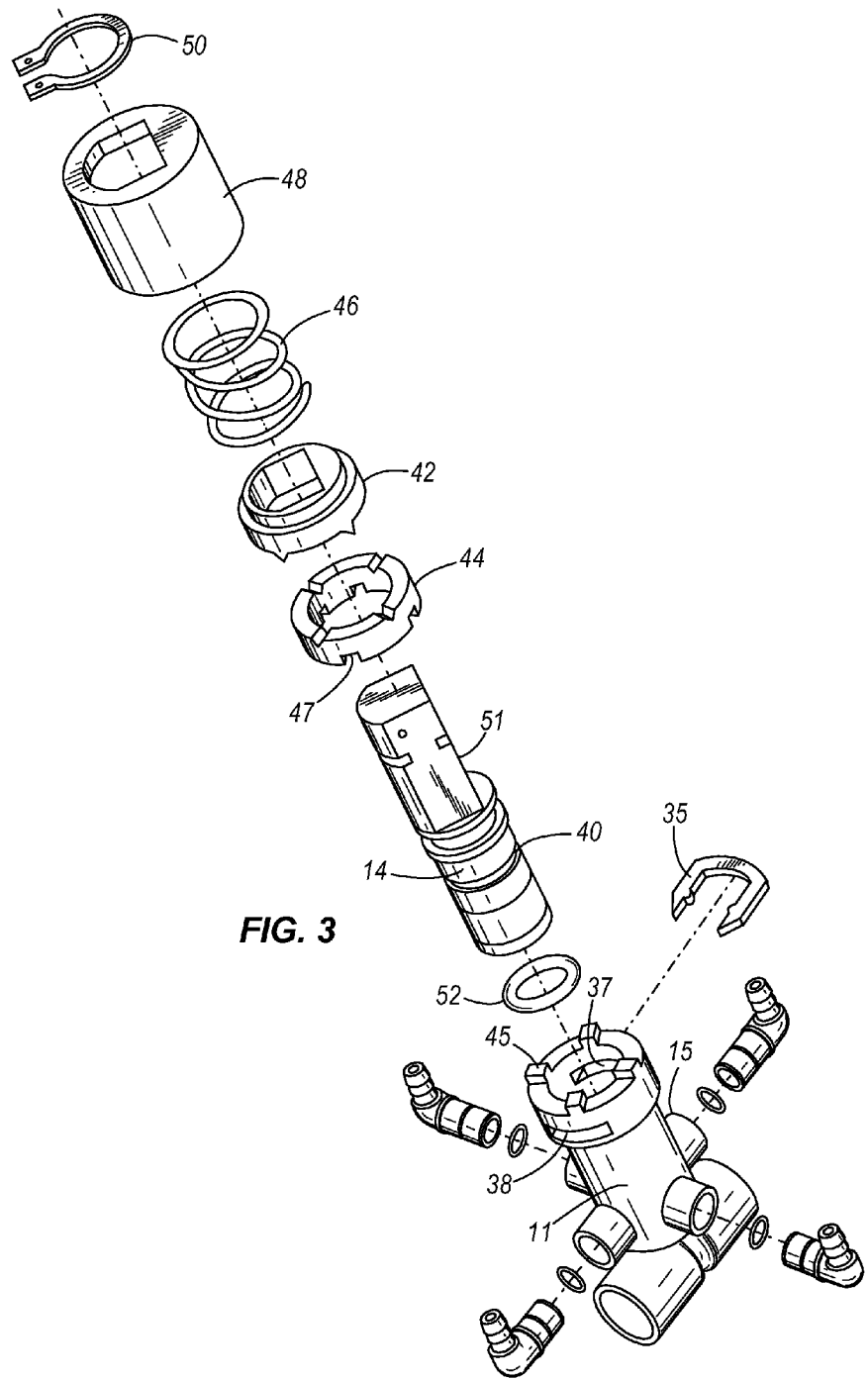
FIG. 3 is another exploded view showing the component parts for placement inside the valve body.
Figure 4:
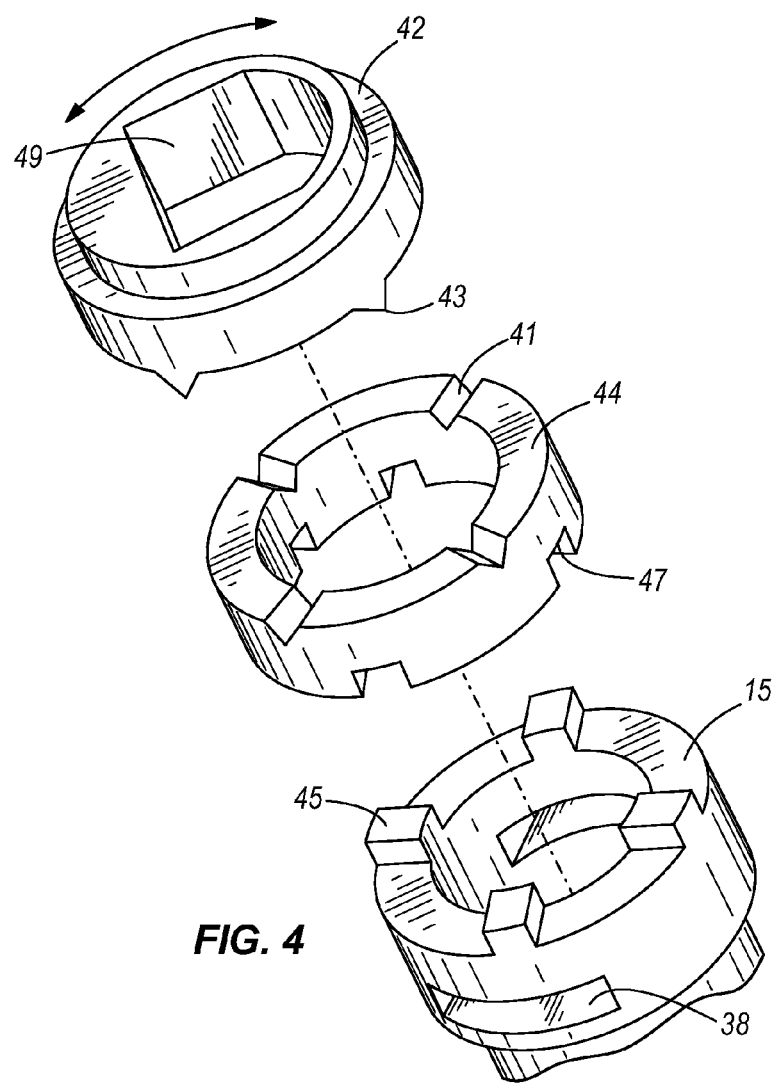
FIG. 4 is still another exploded view showing the valve selector indexing mechanism.
Figure 5:
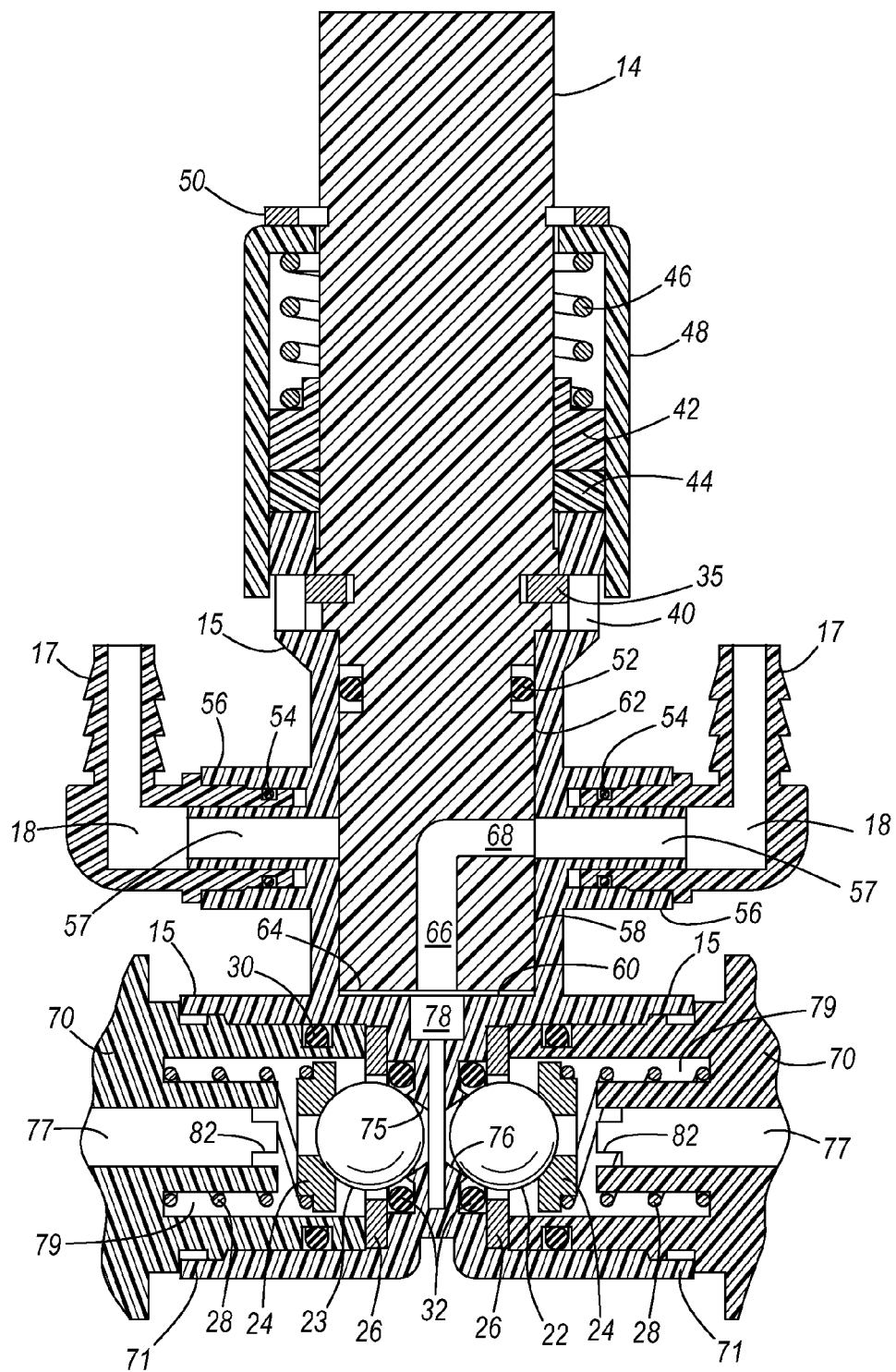
FIG. 5 is a sectional view illustrating one position of the valve.

Referring to FIGS. 3 and 5, valve member 11 is composed of valve stem retainer 35 which fits through slots 37 and 38 in body member 15 and over groove 40 in valve stem 14 to removably retain valve stem 14 in body member 15. An indexing function is provided for the valve stem 14 by means of the indexing plate 42 and indexing receiver 44. Spring 46 biases plate 42 against receiver 44. Indexing receiver 44 is retained on valve stem 14 in a non-rotatable manner by the projections 45 in the body member 15 engaging the cut outs 47 in indexing receiver 44. This is best seen in FIG. 4 where it is also shown the projections 43 on indexing plate 42 for riding over indexing receiver 44 and engaging the indents 41. Indexing plate 42 rotates with valve stem 14 by means of the flat walls, one of which is shown at 49 and the flat side 51 of valve stem 14.

As best seen in FIG. 5, valve body member 15 has a compartment 58 in which valve stem 14 is seated. A seal ring is provided at 52. It also has an end wall 60. A side wall 62 is provided in valve stem 14 as well as an end wall 64. A passageway 66 extends inwardly into valve stem 14 from the end wall thereof and joins passageway 68 which extends inwardly into valve stem 14 from side wall 62.

As also seen in FIG. 5, passages 18 are provided in intake ports 17 and passages 57 are provided in port housings 56 to provide fluid communication with compartment 58 as well as passageway 68 in valve stem 14. Seal rings are shown at 54. It will also be seen in FIG. 5 that body member 15 has eductor ports 71 which connect with eductor ports 70 of eductors 12 and 13. Eductor ports 70 accommodate springs 28 in compartments 79 as well as check ball guides 24. Passages 77 are disposed in eductor ports 70 and communicate with compartment 79. Compartment 79 also accommodates check balls 22 and 23 as they are seated against valve seats 75 and 76 in body member 15. A passage 78 is located in body member and communicates with passageway 66 in valve stem 14 as well as valve seats 75 and 76.

Operation

A better understanding of the selector valve assembly 10 will be had by a description of its operation. Referring to FIGS. 1 and 5, suitable sources of chemical concentrate are connected to intake ports 17 and nipples 19 such as with flexible tubing (not shown). It should be understood that eductor 12 has a faster flow rate than eductor 13. Eductor 12 and hose 72 are employed to fill a bucket, whereas eductor 13 and hose 74 are employed to fill a bottle. When it is desired to fill a bottle, pressurized water is introduced into the inlet 80 of eductor 13. This causes a siphoning effect on check ball 22 by means of passage 77 to move it away from the valve seat 76 to afford fluid communication with passage 78 and in turn passageways 66 and 68. This provides a siphoning effect in intake port 17 to draw chemical concentrate into passage 18, passageways 68, 66, passage 78, compartment 79, past intake portion 82 and into passage 77, in that order. It is ultimately introduced into the water stream in eductor 13 in a well-known manner.

When it is desired to fill a bucket, pressurized water is introduced into the inlet 81 of eductor 12. This causes a reduction in pressure on check ball 23 by means of passage 77 to move it away from valve seat 75 to produce a siphoning effect in passages 78 and passageways 66 and 68 as previously explained in conjunction with eductor 13. This draws chemical concentrate into the eductor 12 and hose 72 as also previously explained. It should be noted that when a siphoning effect is produced on one of the check balls 22 or 23, the other one is seated against its respective valve seal by means of spring 28 and the reduced pressure which moves open the other check ball.

When it is desired to introduce a different chemical concentrate in to the eductors 12 and 13, valve stem 14 is rotated so that passageway 68 is orientated with a different intake port 17. Rotation is facilitated by the indexing plate 42 which is spring loaded against indexing receiver 44 by means of spring 46 held captive in spring retainer 48 by clip 50 secured to valve stem 14. Indexing between indexing plate 42 and indexing receiver 44 is accomplished in a well-known manner. This feature affords a positive locating of the valve stem 14 as well as an audible indicator.

In order to assure that the proper chemical concentrates are connected to the proper intake ports 17, colored bands of different colors can be connected to intake ports such as shown at 84 in FIG. 1.

An important feature of the selector valve assembly 10 are the passageways 66 and 68 in the valve stem 14. These afford less carry-over from one chemical concentrate to the other as passageway 68 is moved from one intake port 17 to another. The reason for this is the cylindrical configuration of valve stem 14 acts as a seamless, continuous chemical pathway for either eductor 12 and 13. The passageways 66 and 68 are preferably of 0.104 inch diameter which affords flow of maximum amount of concentrate with minimum amount of product carry-over. The combined volume of passages 66, 68 and compartments 79 and eductor passages 77 is 0.635 ml. Also the common channel 78 between the check balls 22, 23 and valve seats 76, 75 respectively, is separated by less than 0.100". This combined with the size of the compartments 79 for the check valves 20 and the size of eductor passages 77 minimizes retention of chemical concentrate.

Another important feature is serviceability. In order to service the revolving valve stem 14 or valve cylinder all that is required is to remove clips 50 and 35. The stem 14 can be pulled straight out without removing the selector valve assembly 10 from the eductors 12 and 13 or removing the eductors 80 and 81 and valve assembly 10 from the water valves of a manifold. The spring retaining sleeve 48 connected to the valve stem 14 or handle prevents the clip 35 from backing out of position during use.

The valve assembly 10 allows for a single valve member for use with two eductors. This is a cost savings. It also provides for non unit labeling, where the product is it's own label and the selector valve points toward the intended product. This also allows for a single circuit if an electronic circuit is added for remote monitoring of chemical usage or electronic indicators (flashing lights, LED's, etc.) to further reinforce proper product selection.

The preferred material for manufacturing the selector valve stem 14 is Teflon®. The body member 15 is preferably manufactured from polypropylene. However, other moldable plastic materials could be employed such as a polypropylene copolymer.

The detent on indexing plate 42 affords a stop and audible indicator for the position of the selector valve assembly 10. If desired, it could be eliminated as could the color bands 84. While the selector valve assembly 10 has been illustrated with four intake ports 17 for chemical concentrates, the selector valve can operate with fewer intake ports such as two, or a greater number such as eight. All such modifications within the spirit of the invention are meant to be within a scope as defined by the appended claims.

What is claimed is:

1. A selector valve assembly which can control the flow of different flow paths of fluid, the assembly comprising:
   a body member having a compartment with an end wall;
   an outlet passage in the end wall of the compartment;
   two ports connected to the body member and communicating with the outlet passage in the end wall of the compartment;
   at least two passages communicating with the compartment;
   a rotatable member sealably positioned in the compartment, the rotatable member having a side wall and an end wall;
   a first passageway extending a distance into the rotatable member from the end wall thereof; and
   a second passageway extending through the side wall thereof and communicating with the first passageway, whereby rotation of the rotatable member will selectively orient the second passageway with each of the two passages so as to cause liquid in the two passages to pass to the first and second passageways and subsequently to the outlet passage and at least one of the two ports.

2. The selector valve assembly of claim 1, further including check valve members operatively associated with the two ports.

3. The selector valve assembly of claim 2, wherein the check valve members are contained in a compartment sized to retain a minimum amount of chemical concentrate.

4. The selector valve assembly of claim 1, wherein there are four passages communicating with the compartment.

5. The selector valve assembly of claim 4, further including at least one swivel port connected to the body member and communicating with the four passages.

6. The selector valve assembly of claim 4, further including swivel port members connected to each of the four passages.

7. The selector valve assembly of claim 1, further including an indexing member connected to the rotatable member.

8. The selector valve assembly of claim 7, further including a spring member in biasing contact with the indexing member and a spring retaining member connected to the body member and the spring member.

9. The selector valve assembly of claim 6, further including color indicator means operatively associated with each of the swivel port members.

10. The selector valve assembly of claim 1, wherein the first and second passageways are sized to provide a maximum amount of concentrate flow with a minimum amount of product carry-over.

11. The selector valve assembly of claim 1, wherein the selector valve assembly includes four passages communicating with the compartment and an eductor connected to the outlet passage, whereby rotation of the rotatable member will selectively orientate the second passageway with each of the four passages so as to cause liquid in the four passages to pass to the first passageway and subsequently to the outlet passage and the eductor.

12. The selector valve assembly of claim 11, further including an additional eductor connected to the outlet passage.

13. The selector valve assembly of claim 12, wherein one eductor has a one flow rate and the other has a faster flow rate.

14. The selector valve assembly of claim 12, wherein the eductors are connected to the selector valve assembly by check valves.

15. The selector valve assembly of claim 14, where the check valves are ball check valves.

* * * * *